United States Patent [19]
Sorenson et al.

[11] 3,824,772

[45] July 23, 1974

[54] TURF MAINTENANCE MACHINE

[75] Inventors: Charles E. Sorenson, Mount Vernon; Clyde D. Stubblefield; Arnold A. DeBaillie, both of Evansville, all of Ind.; Robert K. Bramley, Cleveland; Hugh A. Bourassa, University Heights, both of Ohio

[73] Assignee: Hahn, Inc., Evansville, Ind.

[22] Filed: Feb. 26, 1973

[21] Appl. No.: 335,548

Related U.S. Application Data

[62] Division of Ser. No. 220,629, Jan. 25, 1972, Pat. No. 3,771,296.

[52] U.S. Cl................... 56/7, 56/249, 56/DIG. 12
[51] Int. Cl.......................................... A01d 75/30
[58] Field of Search.......... 56/16.7, 17.1, 17.2, 294, 56/249, 249.5, 252, 253, 7, DIG. 12

[56] References Cited
UNITED STATES PATENTS
1,972,680  9/1934  Cushman........................ 56/DIG. 12
2,250,418  7/1941  Funk.................................... 56/249
2,299,859  10/1942  Speiser............................. 56/249.5

*Primary Examiner*—Antonio F. Guida
*Attorney, Agent, or Firm*—Hood & Coffey

[57] ABSTRACT

A turf maintenance machine comprising a vehicle with a plurality of reels connected to the vehicle. Each reel includes a front support roller and rear support roller between which the usual rotary blade and knife bar are disposed, and an additional rear support roller which is mounted for movement between a lower ground engaging position and an upper position. When the additional roller is in its lower position, the first said rear roller is raised above the ground to raise the knife bar. A rotary brush is provided for cleaning the first said rear roller during the cutting operation. Each reel is connected to the vehicle by a support member with the connection between the reel and the support member providing for pivotal movement of the reel relative to the support member about an axis parallel to the axis of its said front roller. Each support member is then connected to the vehicle for pivotal movement about an axis perpendicular to the axis of the front roller of its associated reel.

2 Claims, 8 Drawing Figures

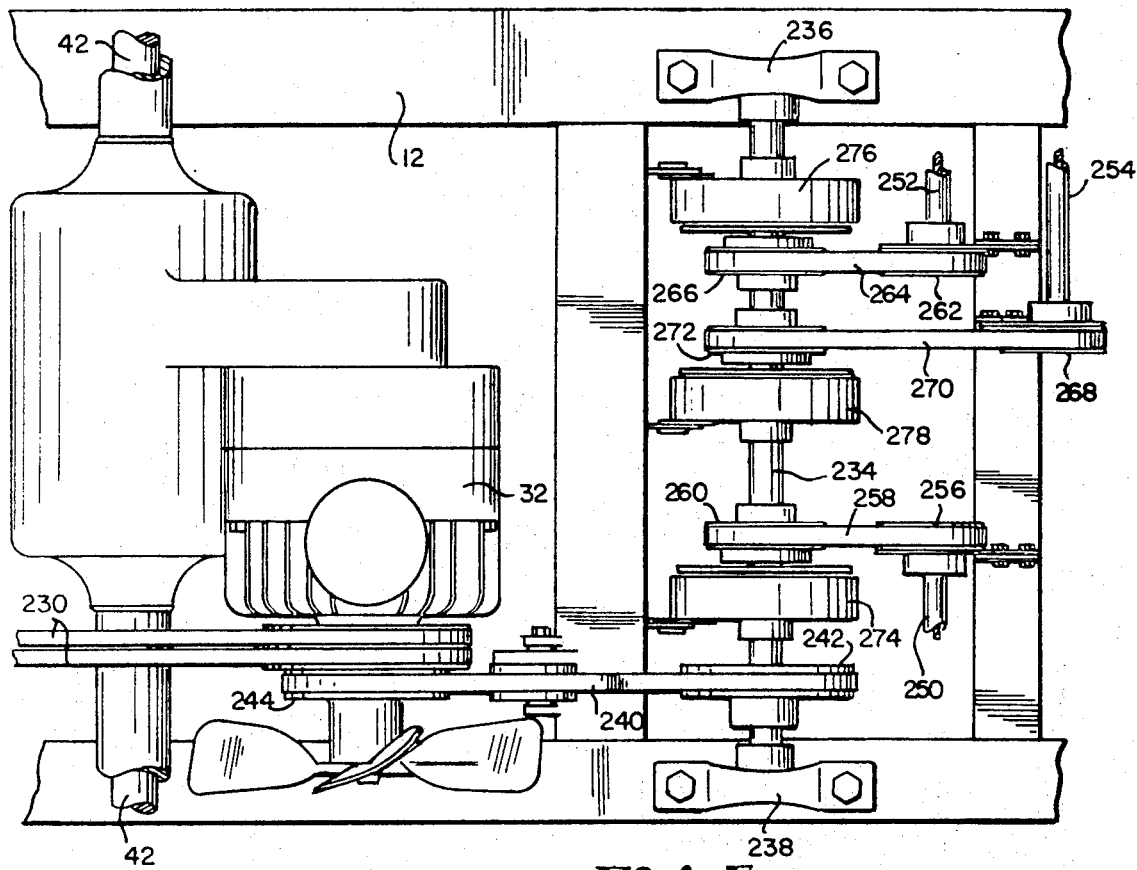
Fig.5
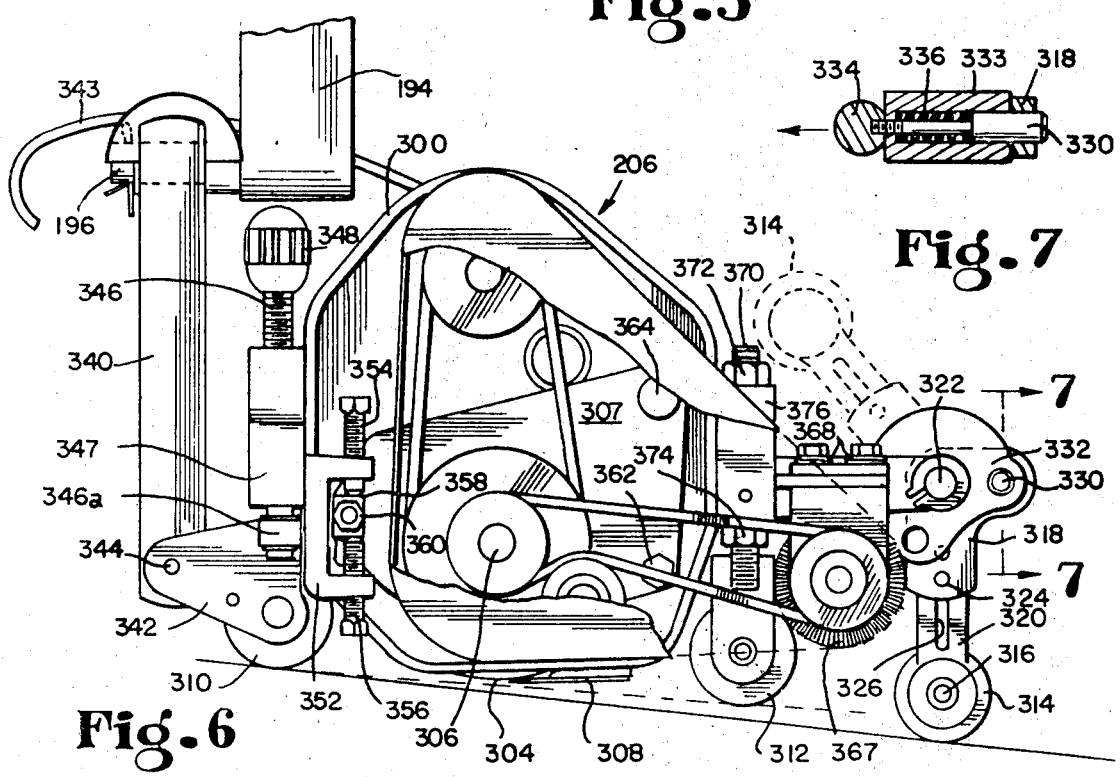
Fig.6
Fig.7

TURF MAINTENANCE MACHINE

This is a division, of application Ser. No. 220,629, filed Jan. 25, 1972, now U.S. Pat. No. 3,771,296, issued Nov. 13, 1973.

It is a primary object of the present invention to provide a turf maintenance machine which is particularly suited for mowing and maintaining golf greens. It will be appreciated that very exacting grass maintenance is required in the maintenance of golf greens. A primary object of the present invention is to provide such a machine which will rapidly cut and maintain a golf green and yet do the job in as exacting manner as can be accomplished by an individual painstakingly using a small lawn mower. The machine of the present invention is constructed and arranged such that relatively large or wide cutting paths can be achieved without damage to the green.

DESCRIPTION OF THE PRIOR ART

In the past, most machines capable of cutting relatively wide strips of grass have not been particularly suited for maintaining golf greens. The maintaining of golf greens requires a machine with very exacting controls. In the past, machines capable of cutting relatively wide strips have not included such controls. For instance, to our knowledge, existing machines have not included means for carefully controlling the number of clips per inch which is the factor controlling the smoothness of greens. Further, existing machines have not included means for steering reel assemblies relative to the vehicle to minimize cutting overlaps. Still further, existing machines have not been provided with suitable means permitting the reel assemblies to articulate independently to follow the terrain.

SUMMARY OF THE INVENTION

One object of the present invention is to provide a turf maintenance machine comprising a rear frame portion suitably mounted on drive wheels and on which the engine, transmission for the drive wheels, fuel tanks, hydraulic tanks and pumps, and seat for the rider-operator are mounted and a front frame portion supported on front wheel means and on which the reels are mounted, the front frame portion being connected to the rear frame portion for pivotal movement relative thereto about a generally vertical steering axis, the front wheel means being connected to the front frame portion for pivotal movement relative thereto about a generally horizontal axis which is perpendicular to the rotational axis of the front wheel means, and each reel being mounted for pivotal movement about a generally forwardly extending horizontal first axis, and about a laterally extending second axis perpendicular to said first axis. Thus, the reels and the front wheel means or front wheels are able to pivot independently about generally horizontally extending axes extending in the direction of movement of the machine to follow the terrain. The rear frame portion, therefore, is the heavier drive portion of the machine while the front frame portion is the lighter and more maneuverable portion of the machine. The front frame portion, which carries the reels, is the steering portion of the vehicle.

Another object is to provide such a machine including a central reel disposed forwardly of the front frame portion and left and right reels disposed, respectively, at the left and right hand sides of the front frame portion, the left and right reels being supported on the front frame portion for pivotal movement therewith about the generally vertical steering axis, and the central reel being supported on the front frame portion for pivotal movement about a generally vertical axis disposed forwardly of the said steering axis. Then, the support for the central reel is independently connected to the steering shaft so that the reels have a different steering ratio to maintain a generally constant cutting overlap.

Still another object of the present invention is to provide such a machine including a driven shaft on the rear frame portion with a flexible cable drive for each reel, the distal end of each cable drive being drivingly connected to its associated reel and the proximal end of each cable drive being drivingly connected to the said driven shaft by means of an electrically operated clutch.

Yet another object of the present invention is to provide such a machine including a fluid-operated power cylinder for moving each reel between its operating position and retracted position, a control valve dominating each cylinder, a master valve dominating the control valves and controlling the flow of fluid to said valves, a control switch for each electrically operated clutch, and a master switch dominating the control switches and controlling the flow of current to said control switches. Each control switch for a clutch is preferably operatively connected to its associated control valve to be operated by operation of the control valve, and the master switch is preferably operatively connected to the master valve to be operated by operation of the master valve. The control valves are used selectively to determine which of the three reels will be moved to their operative position. Operation of a control valve permits operation of the cylinder controlled thereby and, at the same time, permits energization of the clutch controlled by the associated control switch. The master valve is arranged so that the operator of the machine can, by operating the master valve, move the selected reels to their operative position and, at the same time, provide current to energize the clutches associated with the selected reels.

Another object of the present invention is to provide such a machine including a selectively variable transmission for drivingly connecting the engine to the rear drive wheels so that the speed of the said driven shaft to which the cable drives are connected is independent from the ground speed of the vehicle.

Yet another object of the present invention is to provide a machine in which each of the reels is movably supported on the ground by a front roller and a rear roller with the fixed knife bar and the rotary blade assembly being disposed between the two support rollers, and an additional roller mounted for movement into engagement with the ground to raise the rear roller, thereby to raise the height of the fixed knife bar.

The machine of the present invention may be used for functions other than mowing golf greens. The reels for cutting the golf greens may be removed and replaced by reels providing spikers or vertical cutters.

Thus, in this description and in the claims appended hereto, unless otherwise specified, the terms "reel" or "reel assembly" are intended to refer to a lawn maintenance device of the type including a cutting element which rotates about an axis generally parallel with the ground.

Other objects and features of the present invention will become apparent as this description progresses.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

BRIEF DESCRIPTION OF DRAWINGS

FIG. 5 is an enlarged fragmentary view of the drive shaft and electrically operated clutch arrangement for driving the reels;

FIG. 6 is an elevational view, partially cut away, of a reel assembly;

FIG. 7 is an enlarged fragmentary sectional view taken along the section lines 7—7 in FIG. 6.

DESCRIPTION OF THE PREFERRED EMBODIMENT

Figure 1:
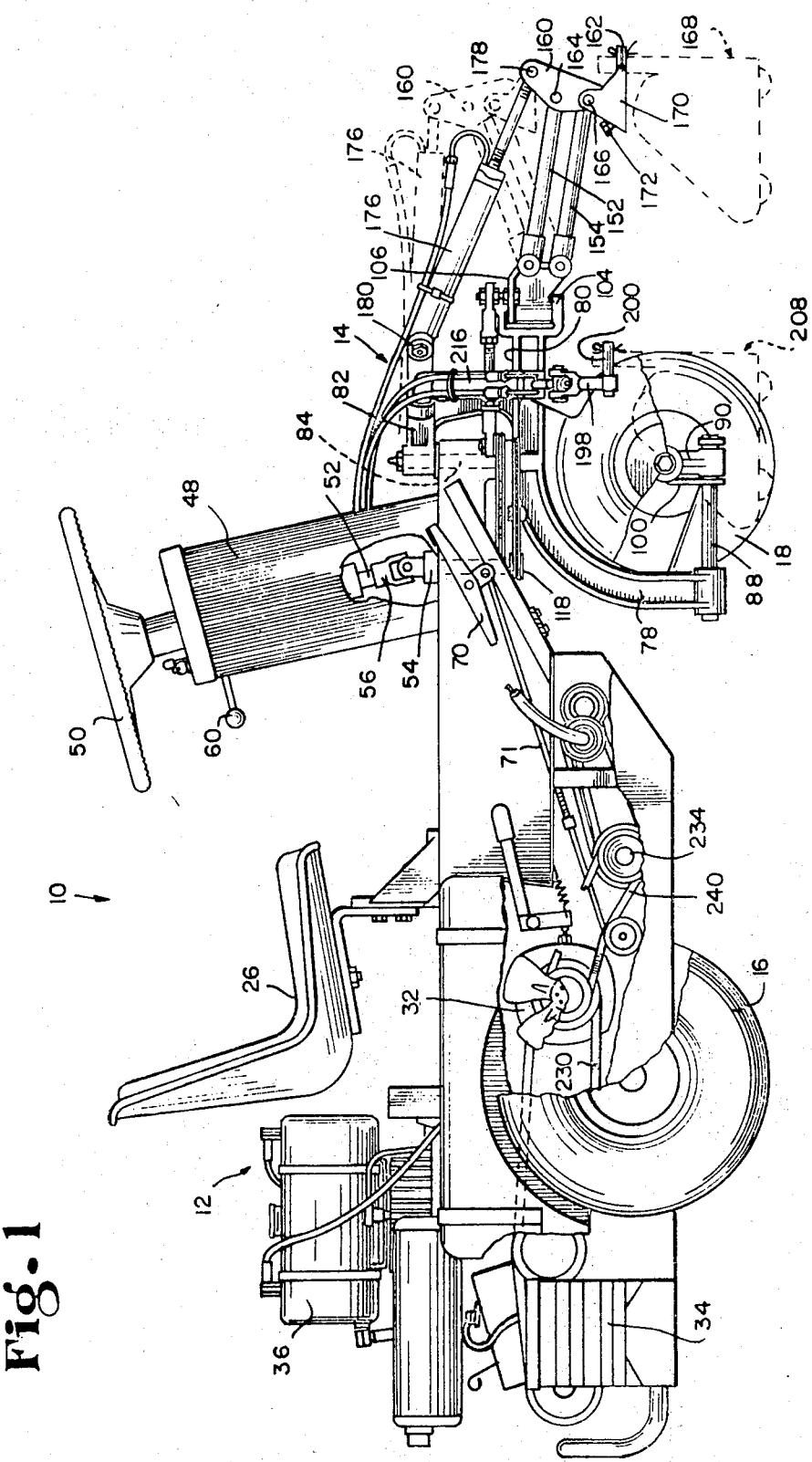
FIG. 1 is an elevational view of the machine of the present invention with the reel assemblies shown in phantom.
Figure 2:
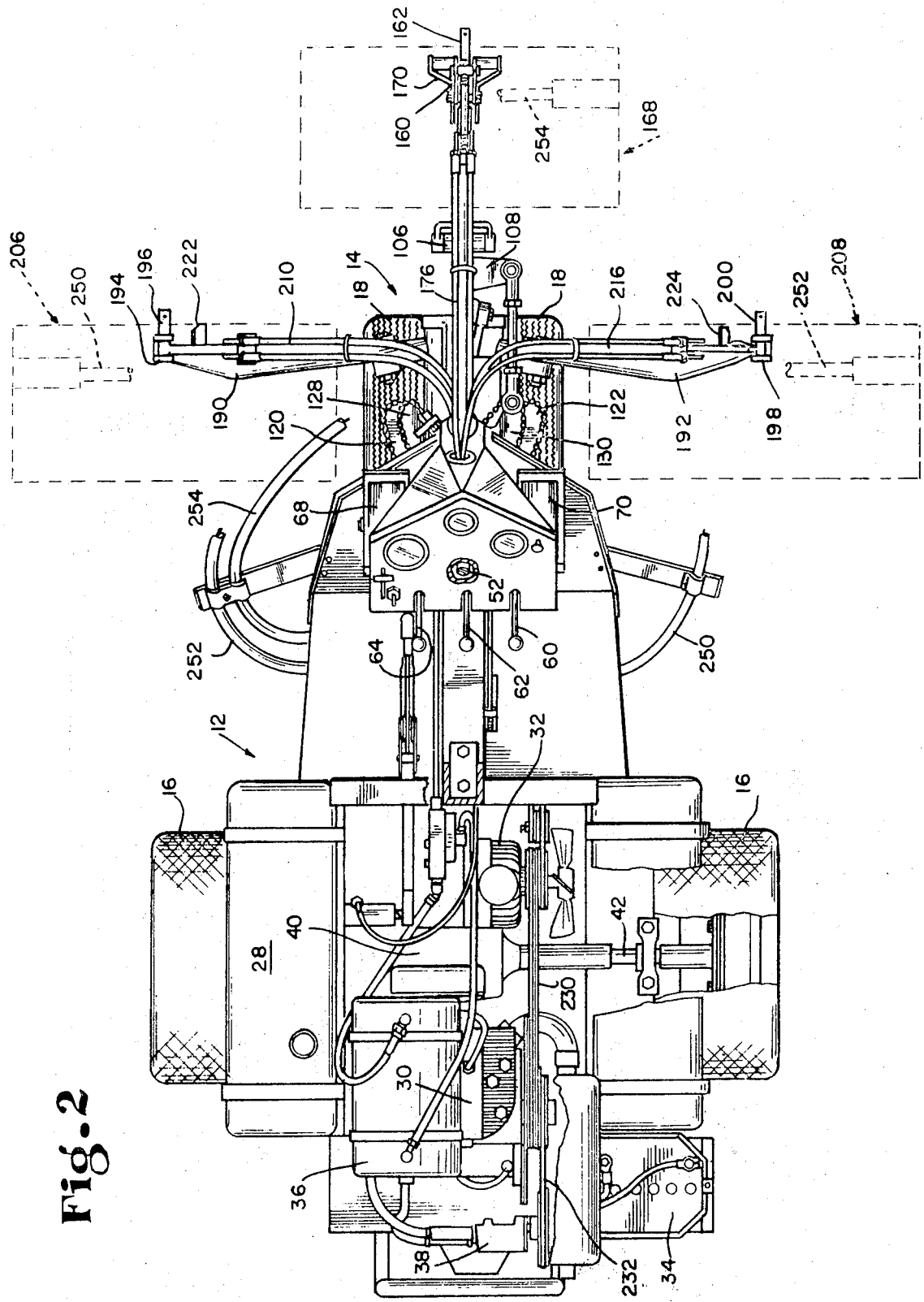
FIG. 2 is a partially sectioned and cut away top view of the machine of the present invention with the seat removed and steering wheel removed and with the reel assemblies shown in phantom.
Figure 3:
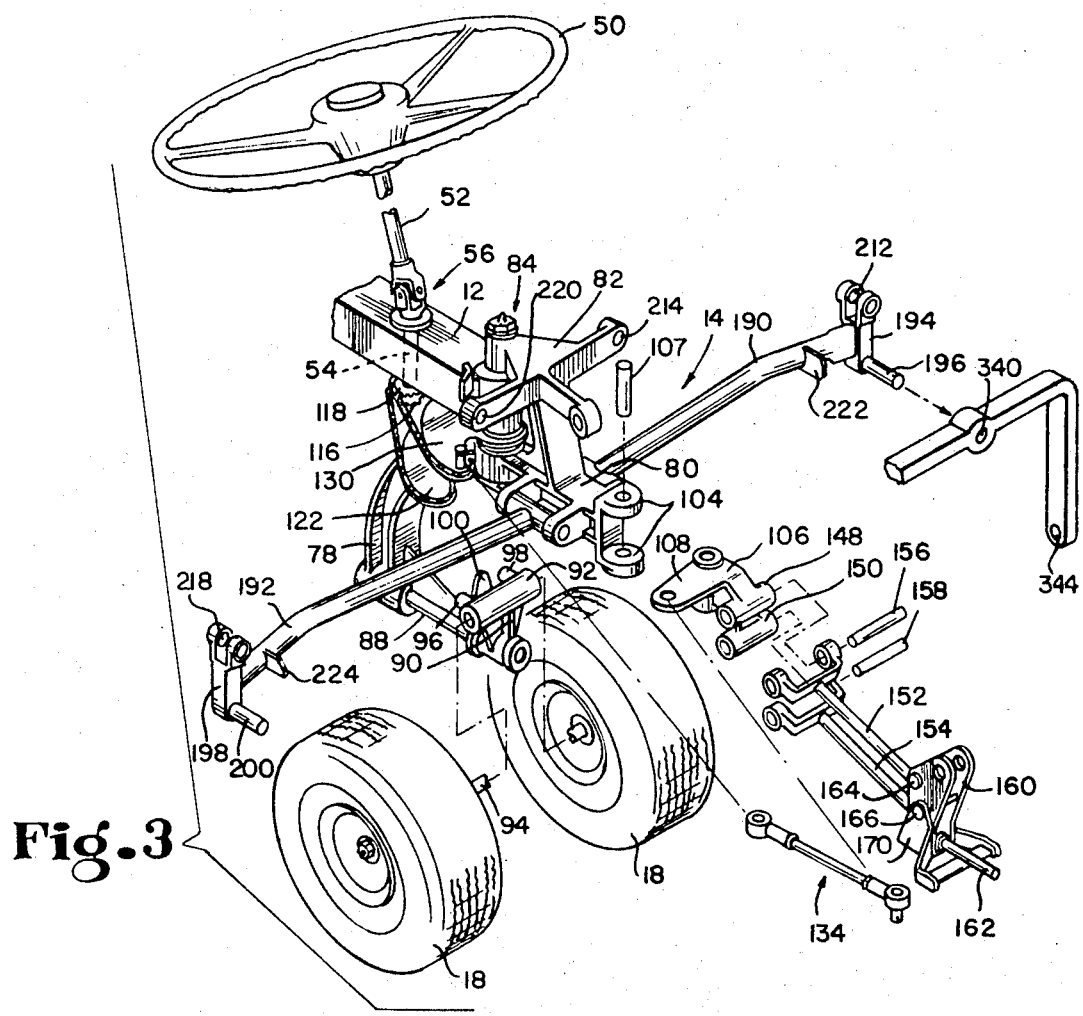
FIG. 3 is a fragmentary perspective view, partially exploded, showing the front frame portion of the vehicle with its supporting wheels and steering mechanism and arms which support the reel assemblies.

Referring now to the drawings and particularly to FIGS. 1 through 4 initially, it will be seen that there is illustrated the turf maintenance machine of the present invention, indicated generally by the reference numeral 10. The machine 10 comprises a vehicle including a rear frame portion 12, front frame portion 14, rear wheels 16 movably supporting the rear frame portion, and front wheels 18 movably supporting the front frame portion. The rear wheels 16 are the drive wheels for the vehicle. It will be appreciated that the front frame portion 14, which is shown in perspective in FIG. 3, is relatively small as compared to the rear frame portion 12.

It will be seen that a seat 26 for the operator, fuel tank 28, engine 30, hydrostatic transmission 32, battery 34, hydraulic fluid tank 36, hydraulic pump 38, and gear reduction and differential assembly 40 are mounted on and carried by the rear frame portion 12. Additionally, a steering housing and control panel 48 are disposed forwardly of the seat 26 to be in front of the operator of the vehicle with a steering wheel 50 mounted above the housing 48 and in front of the seat 26. The steering wheel 50 is mounted conventionally on a steering shaft, the upper portion 52 of which is connected to the lower portion 54 by means of a misalignment coupling 56. The lower portion 54 extends generally vertically downwardly while the upper portion 52 extends slightly rearwardly toward the seat 26.

Further, three valve and switch control levers 60, 62, 64 are disposed on the housing and control panel as illustrated. On the left side of the housing and control panel 48 is a pedal 68 for operating the reels as will be described hereinafter, and on the right-hand side of the housing and control panel is a pedal 70 which is connected by a linkage 71 to the control lever for the hydrostatic transmission 32. The pedal 70, therefore, is used by the operator to control the movement of the vehicle along the ground.

It will be appreciated that the rear wheels 16 are larger in size than the front wheels 18, and that the front wheels are spaced relatively close together while the rear wheels are axially separated to provide stability.

The front frame portion 14 is formed to provide a lower, rearwardly and downwardly curved portion 78, a forwardly extending portion 80, and an upper portion 82. A trunnion 84 is carried by the forward end of the rear frame portion 12, and the front frame portion 14 is mounted on this trunnion for pivotal movement about its axis. This trunnion, therefore, establishes the generally vertical steering axis for the vehicle and about which the front frame portion 14 and its wheels 18 pivot relative to the rear frame portion 12.

A generally horizontally extending trunnion 88 extends forwardly from the lower end of the frame portion 78 and axially between the two front wheels 18. A bracket 90 is mounted on the forward end of the trunnion 88 for pivotal movement about the axis of the trunnion, this bracket carrying a sleeve 92. The two wheels 18 are mounted on an axle 94 which extends axially through the sleeve 92. Thus, the two front wheels 18 can pivot together about the horizontally forwardly extending axis of the trunnion 88, which is below the rotational axis of the wheels, to follow the terrain, i.e., to keep a constant ground pressure regardless of the terrain.

Preferably, means are provided for limiting the pivotal movement of the front wheels 18 relative to the front frame portion 14. In the illustrative embodiment, a pair of rigid stop members 96, 98 extends rearwardly from the sleeve 92. A rigid abutment 100 extends upwardly from the trunnion 88 between the stop members 96, 98 and in the pivotal path of the members to limit pivotal movement of the wheels.

The forwardly extending part 80 of the front frame portion 18 is formed to provide a pair of vertically spaced apart, forwardly extending flanges 104 having coaxially aligned perforations therein. A central reel support 106 is pivotally connected to the flanges 104 by means of a vertically extending pin 107 which extends through the flanges 104 and the reel support. The reel support 106 includes a laterally extending lever portion 108 which will be discussed hereinafter. As viewed in FIG. 4, it will be seen that the reel support 106 pivots about a vertically extending axis 110 which is parallel to and spaced forwardly of the steering axis about which the front frame portion 14 pivots relative to the rear frame portion.

First means is provided for drivingly connecting the front frame portion 14 to the steering means represented by the steering wheel 50 and shafts 52, 54, and second means is provided for drivingly connecting the reel support 106 to the said steering means. In the illustrative embodiment, first and second sprockets 116, 118 are mounted on the shaft 54 for rotation therewith.

A part circular plate concentric with the steering axis (trunnion 84) provides lever portions 120, 122, extending respectively outwardly from opposite sides of the front frame portion 14, the plate being rigidly connected to the front frame portion for movement therewith. A first chain 124 having its opposite ends connected respectively to the distal ends of the lever portions 120, 122 and its intermediate portion trained about the first sprocket 116 is provided so that rotation of the sprocket drives the front frame portion about the steering axis.

Another part circular plate concentric with the steering axis provides second lever portions 128, 130 extending respectively outwardly from opposite sides of the front frame portion, this plate (second lever portions 128, 130) being pivotally movable relative to the front frame portion as well as to the plate providing the lever portions 120, 122. A second drive chain 132 having its opposite ends connected respectively to the distal ends of the second lever portions 128, 130 and its intermediate portion trained about the second sprocket 118 is provided so that rotation of the sprocket 118 pivots the second lever portions about the steering axis and relative to the front frame portion.

Figure 4:
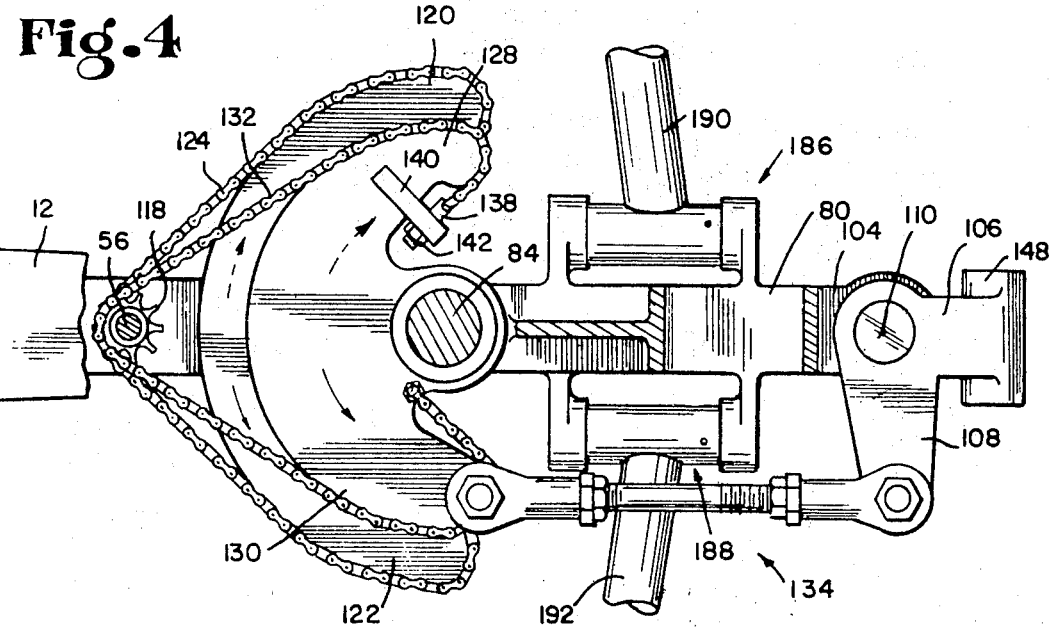
FIG. 4 is an enlarged fragmentary sectional view of the steering mechanisms for the machine including the means for steering the front reel assembly relative to the front frame portion.

As viewed in FIG. 4, it will be appreciated that the lever portions 120, 122 are allochirally related with the opposite end portions of the drive chains trained about the peripheries of the lever portions, and that the second lever portions 128, 130 are allochirally related with the opposite end portions of the second drive chain 132 trained about the peripheries of the second lever portions. As the plates pivot about the steering axis, the chains 124, 132 wrap about one side of the plate and unwrap from the other side of the plate.

It will also be appreciated that the upper plate providing the lever portions 128, 130 is smaller than the lower plate. Thus, the first sprocket 116, lower plate and chain 124 constitute a first transmission for drivingly connecting the steering shaft to the front frame portion, the first transmission providing a first speed reduction ratio, while the sprocket 118, the upper plate and the chain 132 provide a second transmission means for drivingly connecting the steering shaft to the central reel support 106, the second transmission means providing a second and lower speed reduction ratio.

The upper plate 130 is drivingly connected to the lever portion 108 by a rigid link means 134, the length of which is preferably adjustable so that the position of the central reel support 106 can be adjusted relative to the front frame portion 14. Additionally, preferably, means such as the illustrated threaded connector 138, block 140 and nut 142 are provided for adjusting the chains 124, 132.

The central reel support 106 is formed with generally horizontally extending sleeves 148, 150 providing a pair of vertically spaced apart, parallel and generally horizontally extending pivot axes. A pair of forwardly extending reel supporting arms 152, 154 having their proximal ends pivotally connected to the central reel support by pins 156, 158 for movement respectively about the sleeve 148, 150 axes is provided. A rigid bracket 160 including a horizontally forwardly extending trunnion 162 is pivotally connected to the distal ends of the arms 152, 154 by means of the illustrated pivot pins 164, 166. The trunnion 162 provides a horizontally forwardly extending pivot axis for the central reel 168. The pivot axes provided by the pins 164, 166 are parallel to the axes of the sleeves 148, 150 (pins 156, 158) and vertically spaced apart by a distance equal to the vertical distance between the axes of the sleeves. Thus, the pivot axis of the trunnion 162 remains generally horizontally as the arms 152, 154 are raised and lowered to raise and lower the central reel 168.

Preferably, stop means is provided for limiting the pivotal movement of the reel 168 about the trunnion 162. In the illustrative embodiment, this stop means includes a stop assembly 170 including a pair of forwardly extending stop fingers, the stop assembly 170 being mounted for pivotal movement relative to the bracket 160 about the axis of the pin 166. The illustrative stop assembly 170 is adjustable by means such as an adjustment screw 172, the head of which engages the arm 154 to determine the position of the fingers.

The central reel 168 is selectively raised and lowered by means of a hydraulic cylinder 176, the distal end of the piston of which is connected to the bracket 160 as indicated at 178 and the proximal end of the cylinder of which is connected to the upper portion 82 as indicated at 180. The connection made at 180, of course, must accommodate the movement of the central reel support 106 about the axis 110. Such a swivel connection can, of course, be made in a conventional manner.

As clearly shown in the enlarged view of FIG. 4, left and right reel supports 186, 188 are disposed, respectively, on the left and right sides of the front frame portion 14, the left and right reel supports being rigidly connected to the front frame portion for pivotal movement therewith about the steering axis of the trunnion 84. Each left and right reel support 186, 188 provides a horizontal pivot axis extending forwardly and generally parallel to the trunnion 88, i.e., perpendicular to the rotational axis of the front wheels 18. Left and right reel supporting arms 190, 192 are provided, the arms having their proximal ends pivotally connected respectively to the left and right reel supports for movement about their said horizontally forwardly extending pivot axes. The arm 190 provides, at its distal end, support means 194 providing a forwardly extending trunnion 196 defining a pivot axis parallel to the axis about which the arm 190 pivots. Similarly, the arm 192 includes such a support means 198 providing such a trunnion 200 defining a pivot axis parallel to the axis about which the arm 192 pivots.

Reels 206, 208 are respectively mounted on the trunnions 196, 200 for pivotal movement about the axes of the trunnions. A hydraulic cylinder 210 is provided for raising and lowering the left reel 206, the piston being connected to the support 194 as indicated at 212 and the cylinder being connected to the upper portion 82 as indicated at 214. Similarly, a hydraulic cylinder 216 is provided for raising and lowering the right reel 208, the piston being connected to the support 198 as indicated at 218 and the cylinder being connected to the upper portion 82 as indicated at 220.

Each of the arms 190, 192 carries stop means 222, 224 for limiting the pivotal movement of the reel 206, 208 carried thereby about the axis of the trunnion 196, 200. It will be appreciated that the stops 222, 224 are arranged such that when the arms 190, 192 are raised, the stops will engage the reels to prevent them from pivoting.

Referring now particularly to FIGS. 1, 2, 5 and 8, it will be seen that the hydrostatic transmission 32 is drivingly connected to the engine by belt means 230 and that the hydraulic pump 38 is drivingly connected to the engine by means of a belt 232. Disposed forwardly of the hydrostatic transmission 32 is a jack shaft or driven shaft 234, the ends of which are journal mounted by means of bearings 236, 238 on the frame portion 12. A belt 240 is trained about a pulley 242 on the shaft 234 and a pulley 244 on the input shaft of the hydrostatic transmission 32, i.e., the shaft which is driven by the belt means 230. Thus, the shaft 234 is drivingly connected to the engine so that the rotational speed of the shaft 234 is dependent directly on the speed of the engine. This feature allows the ground speed and the speed at which the reels are driven to be independent. Particularly, the reels are driven from the shaft 234 which rotates at a speed directly proportional to the engine speed while the axle 42 is driven from the hydrostatic transmission 32, the output speed of which is selectively variable and controlled by the pedal 70. The number of clips per inch can, therefore, be established by controlling the speed of the shaft 234 relative to the ground speed of the machine 10.

There are a flexible drive cable 250 for the left reel, a flexible drive cable 252 for the right reel and a flexible drive cable 254 for the central reel. The proximal end of the flexible cable 250 is drivingly connected to a pulley 256 which, in turn, is drivingly connected by a belt 258 to a pulley 260 on the shaft 234. The proximal end of the cable 252 is drivingly connected to a pulley 262 which, in turn, is drivingly connected by a belt 264 to a pulley 266 on the shaft 234. Then, the proximal end of the cable 254 is drivingly connected to a pulley 268 which, in turn, is drivingly connected by means of a belt 270 to a pulley 272 on the shaft 234. It will be appreciated from FIG. 5 that the pulleys 256, 258, 262 are journal mounted on brackets spaced forwardly from the shaft 234.

Electrically operated clutches 274, 276, 278 are provided for respectively drivingly connecting the pulleys 260, 266, 272 to the shaft 234 for rotation therewith. When the clutches are energized, the pulleys rotate with the shaft 234 respectively to drive the cables 250, 252, 254.

Figure 8:
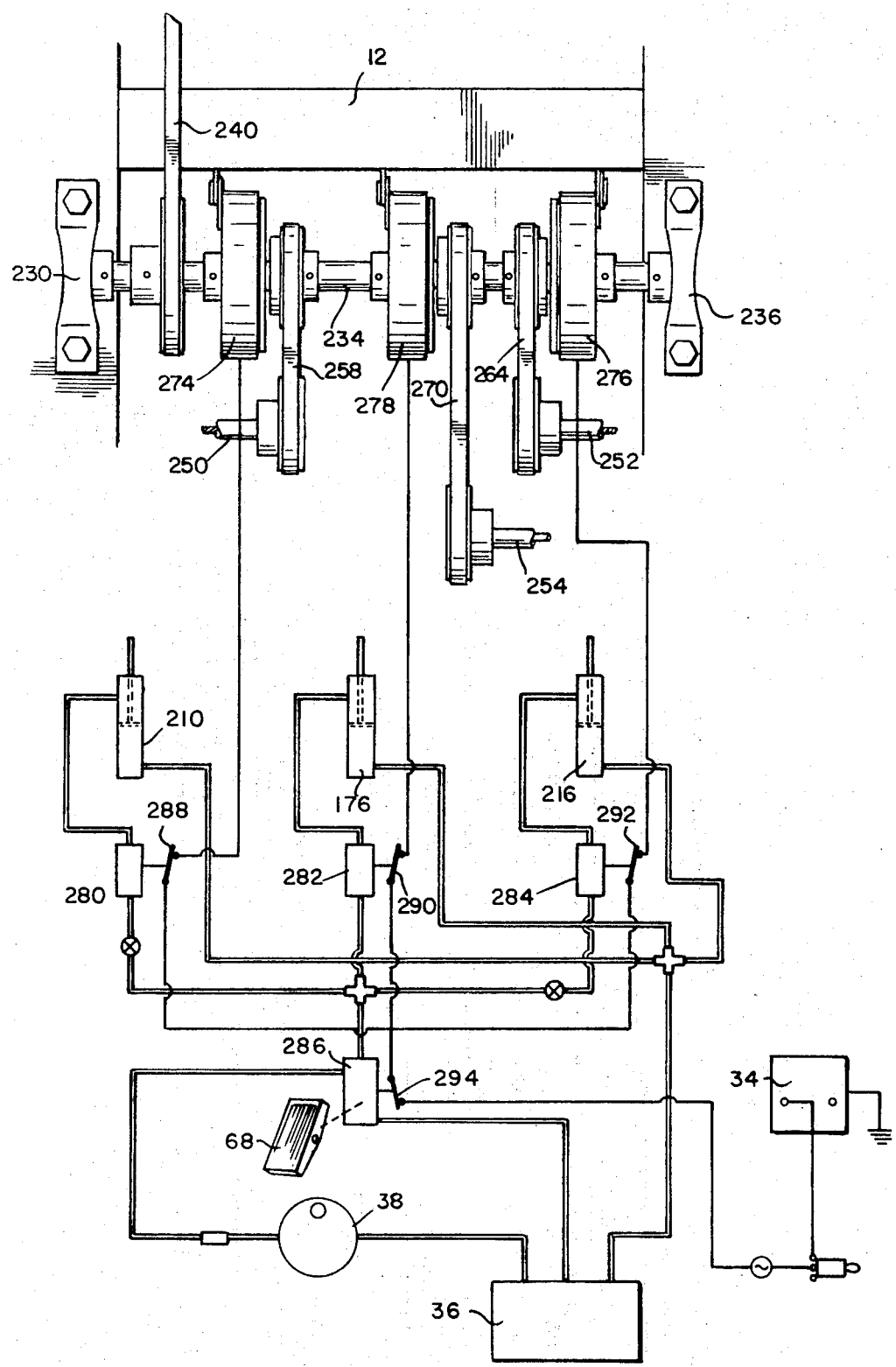
FIG. 8 is a diagrammatical view showing the hydraulic controls and electrical controls for positioning and driving the reel assemblies.

Referring further to FIG. 8, the manner in which the clutches 274, 276, 278 and the power cylinders 176, 210, 216 are controlled and operated will be discussed. A control valve 280, 282, 284 is provided for dominating each cylinder 210, 176, 216, and a master valve 286 is provided for dominating the control valves and controlling the flow of hydraulic fluid to the control valves. The master valve 286, which may be a conventional 3-way valve, is operated by the foot pedal 68 discussed previously. Each of the valves 280, 282, 284 may be conventional 2-way valves disposed as shown in FIG. 8 in the hydraulic lines. These control valves are operated manually by moving the levers 60, 62, 64 associated respectively therewith.

A control switch 288, 290, 292 is provided for dominating each clutch 274, 278, 276 as shown in FIG. 8, and a master switch 294 is provided for dominating the control switches and controlling the flow of current to the control switches. Each control switch 288, 290, 292 is operatively connected to its associated control valve 280, 282, 284 to be operated by the operation of the control valve. Particularly, each of the switches 288, 290, 292 is a switch, such as a microswitch, the actuator of which is moved by some mechanism, such as the lever 60, 62, 64, moving its associated control valve. Similarly, the switch 294 is operatively connected to the master valve 286 to be operated when the master valve is operated by depressing the pedal 68.

The purpose of the control valves 280, 282, 284 and the control switches 288, 290, 292 is to determine which of the three reels 168, 206, 208 will be lowered and driven during operation of the machine 10. For instance, if it is desired that the central reel 168 not be operative, the valve 282 and switch 290 can be operated so that, when the master valve 286 and 294 are operated, the central reel will not be lowered and the clutch 278 will not be energized to drive the cable 254. If all of the switches 288, 290, 292 remain closed and all of the valves 280, 282, 284 remain open, the reels 168, 206, 208 can be simultaneously raised and lowered and driven when lowered by actuating the pedal 68 which manipulates the master valve 286 and master switch 294.

The arrangement of the pedal 68, master valve 286 and master switch 294 may take different forms. One preferred form is to have the pedal, valve and switch arranged such that depressing the front half of the pedal lowers the reels, and when the pedal is full forward and down, the reels are driven (clutches are energized). Then, depressing the rear half of the pedal raises the reels and deenergizes the clutches to stop the reels.

Turning now to FIG. 7, the preferred reel structure will be discussed, only the reel 206 being illustrated for convenience. Further, since only one side of the reel is shown and discussed, it will be appreciated that the other side includes corresponding mounting brackets, connecting elements and the like. The reel 206 includes a frame assembly upon which a generally conventional rotary blade 304 is mounted for rotation about an axis defined by the shaft 306 supported in a plate 307, the axis extending generally parallel with the ground. Below the rotary blade 304 is an axially extending fixed knife bar 308 which cooperates with the rotary blade in clipping grass. The frame assembly 300 is movably supported on a front roller 310 which rotates about an axis parallel to the axis of the shaft 306 and which extends across the front of the reel 206. The frame assembly 300 is also movably supported on a rear roller 312 disposed behind the fixed knife bar 308. The roller 312 is parallel to the shaft 306 and extends across the reel 206. The front and rear rollers 310, 312, therefore, establish the height of the frame assembly 300 and the fixed knife bar 308 which is carried by the frame assembly. As will be discussed hereinafter, the positions of these rollers 310, 312 can be adjusted to adjust the height of the blade 308. For example, if a green is being cut at one-fourth inch, the rollers 310, 312 can be adjusted to place the fixed knife bar 308 at the proper height for making a one-fourth inch cut.

It is desirable to have collars or "fringes" as they are sometimes called extending perimetrally about the greens to act as a brake to slow the roll of the golf ball. Such collars are a desirable part of all championship greens, and they enhance the beauty of the greens.

The height of cut on collars is, on the average, approximately twice the height of cut of the green. For example, if the green is being maintained at one-fourth inch, then the collar would be cut at one-half inch.

Since the machine 10 is particularly suited for maintaining greens, each reel assembly preferably includes an additional roller 314 journal mounted for rotation about an axis 316 which also is parallel to the axes of the rollers 310, 312. Means, such as the extensibly related brackets 318, 320 is provided for mounting the additional roller 314 for movement between a lower, ground engaging position and an upper position shown in phantom. In the illustrative embodiment, the bracket 318 swings about a horizontally extending axis 322 so that the roller 314 can be moved from its lower position to its upper position. Illustratively, the position of the roller 314 may be adjustable by means of a fastening element 324 extending through the bracket 318 and an elongated slot 326 in the bracket 320. The bracket 320 can be extended such that, when the additional roller 314 is engaging the ground, the rear roller 312 is lifted from the ground as illustrated to raise the fixed knife bar 308. For instance, the roller 314 can be arranged to raise the fixed knife bar 308 to make the one-half inch cut on the collar of the green.

The bracket 318 is supported by a frame element 332 extending rearwardly from the frame assembly 300. The roller 314 is locked in its lower, ground engaging position by means of a pin 330 which extends into engagement with an opening in this element 332. Referring to FIG. 7, it will be seen that the pin 330 is disposed for reciprocation in a fitting 333 attached to the bracket 318. A knob 334 is connected to the pin 330 so that the pin can be pulled out of engagement with the opening in the element 332. A spring 336 is provided for urging the pin into engagement with the opening in the element 332.

It will be appreciated, therefore, that the roller 314 can be easily moved into its lower, ground engaging position quickly to change (raise) the height of the cut.

The reel 206 is carried on and supported by an inverted U-shaped support bracket 340. The trunnion 196 extends through an opening in the upper cross bar of the support 340 as suggested at the right-hand side of FIG. 3.

The front roller 310 is journal mounted on forwardly extending brackets 342 at the ends of the roller, these brackets 342 being respectively pivotally connected to the distal ends of the downwardly extending legs of the support 340 as indicated at 344. The brackets 342 are rigidly fastened by adjustment means to be described hereinafter to the frame assembly 300. Thus, the entire frame assembly 300 of the reel 206 pivots about the axis indicated at 344 relative to the trunnion 196. In other words, the reel 206 pivots about the horizontal forwardly extending axis of the trunnion 196 as well as about the axis indicated at 344 which is perpendicular to the axis of the trunnion 196 to permit the rollers 310 and 312 or 314 to follow the ground.

A hook 343 extends forwardly from the frame assembly 300 as illustrated in FIG. 6. The purpose of the hook 343 is to engage the support 340 when the supporting arm for the reel 206 is raised, thereby to limit pivoting of the reel about the axis indicated at 344.

The position of the frame assembly 300 relative to the roller 310 is selectively adjusted by rotating a threaded shaft 346 which threadedly engages a block 347 which is attached to the frame assembly. The lower end of the shaft 346 is journal mounted in a bearing 346a connected to the bracket 342. There is a knob 348 on the upper end of the shaft 346 for raising and lowering the bracket 342 relative to the block 347. Locking screws (not shown) are provided for rigidly connecting the bracket 342 to the block 347 in any selected position. These screws are loosened to effect adjustment and then tightened after adjustment. Further, a generally C-shaped bracket 352 is rigidly connected to the block 347. Screws 354, 356 are carried by the bracket 352 as illustrated in FIG. 6 to engage a block 358 which is attached to the plate 307 supporting the shaft 306 for the reel 304, i.e., the bearing for the reel 304. Adjustment of block 358, therefore, adjusts the reel 304 relative to the knife bar 308 which is fixed relative to the frame assembly 300.

A locking nut 360 is threaded on a fastening element which extends through the block 358 as illustrated. The block 358 is slotted to permit adjustment of the plate 307 about the axis of bolt 362. A carriage bolt 364, which extends through an arcuate slot in the plate 307, is also loosened to accomplish the adjustment of the plate.

The position of the rear roller 312 relative to the frame assembly 300 is accomplished by positioning the threaded shaft 370 which supports the roller 312. Lock nuts 372, 374 are threaded on the shaft 370 to engage, respectively, the upper and lower ends of a block 376 connected to the frame assembly. Primarily the purpose of this adjustment is to make the axis of the roller 312 parallel to the knife bar 308.

We have provided a driven spiral brush 367 which is journal mounted to extend parallel to the roller 312. The brush 367 engages the roller 312 throughout its length and turns against the roller 312 to keep grass clippings from sticking to and building up on the roller. For this reason, the brush 367 serves a very useful purpose because a build up of grass clippings on the roller 312 will raise the knife bar 308 and destroy the height accuracy and smoothness of the cut.

The position of the brush 367 relative to the roller 312 may be established by adding and removing shims such as indicated at 368. These shims 368 may be added or removed to compensate for brush wear.

The build up of grass clippings on the front roller 310 is not generally as bad as it is on the rear roller 312. Means, such as a scraper (not shown) may be used to keep the front roller clean.

What is claimed is:

1. A turf maintenance machine comprising a vehicle, a plurality of grass cutting reels operatively connected to said vehicle for movement therewith, each said reel including a frame assembly, an axially elongated rotary blade journal mounted on said frame assembly for rotation about an axis generally parallel to the ground, a knife bar extending axially along and underneath said rotary blade and arranged to cooperate with said rotary blade in clipping grass, a front roller journal mounted on said frame assembly forwardly of said knife bar for rotation about an axis parallel to said rotary blade axis, said front roller being mounted so that the position of its journal axis relative to said frame assembly is stationary, a rear roller journal mounted on said frame assembly rearwardly of said knife bar for rotation about an axis parallel to said rotary blade axis, said front and rear rollers being arranged movably to support said frame assembly on the ground, an additional roller journal mounted for rotation about an axis parallel to said rotary blade axis, and means for mounting said additional roller on said frame assembly for movement between a lower ground engaging position and an upper position, said additional roller and its said mounting means being proportioned and designed such that, when said additional roller is in its lower position, said rear roller is raised above the ground to raise said knife bar and a support member for each said reel, each said reel being connected to its support member for pivotal movement relative to the support member about an axis parallel to the axis of its said front roller, an arm extending outwardly from said machine for each reel, means for connecting each said support member to its associated arm for pivotal movement relative to said arm about an axis perpendicular to the axis of said front roller and generally horizontally and longitudinally of said machine.

2. The machine of claim 1 in which said vehicle comprises a rear frame portion, a front frame portion, means for connecting said front frame portion to said rear frame portion for pivotal movement about a steering axis, rear wheel means for movably supporting said rear frame portion, front wheel means for movably supporting said front frame portion, and means for connecting said front wheel means to said front frame portion for pivotal movement about an axis extending generally perpendicularly to the rotational axis for said front wheel means, longitudinally of said machine, and generally parallel to the said axes about which said support members pivot, said support members being carried by said front frame portion.

* * * * *